United States Patent Office 3,579,598
Patented May 18, 1971

3,579,598
DEHYDROCYCLIZATION PROCESS AND CATALYST
Rowland C. Hansford, Yorba Linda, Calif., assignor to Union Oil Company of California, Los Angeles, Calif.
No Drawing. Filed Aug. 14, 1967, Ser. No. 660,240
Int. Cl. C07c 5/18, 15/02; B01j 11/16
U.S. Cl. 260—673.5                                          7 Claims

ABSTRACT OF THE DISCLOSURE

Paraffin hydrocarbons are converted to aromatic hydrocarbons by dehydrocyclization at elevated temperatures and low pressures, in the presence of added hydrogen and a catalyst comprising minor proportions of a Group VIII noble metal and at least one oxide of the metals calcium, strontium, or barium, supported on a silica gel base.

BACKGROUND AND SUMMARY OF THE INVENTION

The invention relates to the dehydrogenation and cyclization of paraffin hydrocarbons to produce aromatic hydrocarbons therefrom, the principal novel feature of the process residing in the use of a new class of catalysts for the process, which catalysts are found to be more active and more selective than other presumably equivalent and more expensive catalysts of the prior art.

It is well known that paraffin hydrocarbons containing six or more carbon atoms can be converted to aromatic hydrocarbons by heating at high temperatures and low pressures. However, the thermal conversion is highly inefficient due to competing reactions of cracking and the polymerization of unsaturated intermediates, leading respectively to the production of large amounts of gaseous hydrocarbons and heavy polymers. It is known that a more selective conversion can be obtained by the use of Group VIII noble metal catalysts supported on adsorbent carriers. A major problem in using these catalysts lies in their tendency to become rapidly deactivated by coke-like deposits arising from the polymerization of olefinic intermediates and/or the condensation of olefins with aromatic hydrocarbons.

Most of the commonly used adsorbent carriers such as activated alumina contain active surface acidity which tends to promote the isomerization of n-paraffins to isoparaffins, which upon dehydrogenation yield unsaturated hydrocarbons which tend to polymerize rather than cyclize, and which can also condense with aromatic hydrocarbons to produce polycyclic aromatics, all resulting ultimately in the formation of coke. The surface acidity of the catalyst also tends to promote cracking with resultant production of gaseous hydrocarbons. Attempts have previously been made to reduce the amount of hydrocracking and isomerization by adding alkali metal oxides to alumina-based catalysts to thereby reduce their surface acidity, but these attempts have been only partially successful. In fact, unless the alkali metal ion is small enough to build into the alumina lattice, substantially no beneficial results are obtained.

It is known that pure silica gel is substantially devoid of surface acidity but, quite unexpectedly, it has been found that the use of pure silica gel as a support for platinum does not improve the selectivity of conversion to aromatics. Thus, platinum supported on a pure silica gel derived from the hydrolysis of ethylortho-silicate was not only much less active than platinum supported on alumina, but it was even less selective due to increased conversion of the feed to gas and coke. The use of alkali metal oxide inhibitors in this case is not feasible owing to the low melting point of alkali metal silicates, resulting in poor catalyst stability. However, the use of alkaline earth metal oxides is not beset with such difficulty. For example, the melting point of barium silicate is approximately the same as that of silica.

It has now been found that the heavier, more alkaline members of the alkaline earth metals, i.e. calcium, strontium and barium are not only very effective in inhibiting the hydrocracking and isomerization activity of silica gel based catalysts, but the activity of the supported Group VIII noble metal for dehydrocyclization is greatly increased over its activity when supported on pure silica gel. Further, it has been found that the resulting catalysts maintain their dehydrocyclization activity in the presence of added hydrogen at pressures in the range of about 0–300 p.s.i. The use of hydrogen at these pressures is beneficial in reducing catalyst deactivation rates due to coking. The use of hydrogen in connection with alkali metal-inhibited platinum-alumina catalysts has previously been considered undesirable (see U.S. Patent No. 2,987,560). In the case of other known dehydrocyclization catalysts such as chromia-alumina, or molybdena-alumina, it has been observed that added hydrogen suppresses the specific activity of the catalyst for dehydrocyclization. It hence came as a distinct surprise to find that hydrogen could be used beneficially in connection with the catalysts of this invention.

CATALYST DETAILS

The silica gel base employed herein may be prepared by any conventional method, e.g. by the acidification of sodium silicate solutions, or by the hydroylsis of organic silicates such as ethylorthosilicate with dilute aqueous ammonia. It is preferred to employ silica gels having relatively large average pore diameters of about 50–200 A., and low to medium surface areas in the range of about 100–300 square meters per gram. Methods for producing such silica gels of controlled pore diameter and surface area, as by steaming, aging in aqueous solutions, etc., are well known in the art and hence need not be described in detail.

In general, the addition of alkaline earth metal oxide in any amount up to about 50 percent by weight will be found to give beneficial results. However, for practical purposes, amounts in the range of about 1% to 25% are ordinarily contemplated, with the preferred range being about 2% to 15% by weight. The preferred alkaline earth metals are strontium and barium; calcium is somewhat less basic and hence is ordinarily employed in larger amounts. The addition of alkaline earth metal oxide may be carried out by conventional methods such as impregnation with aqueous solutions of salts thereof, e.g. nitrates, acetates, etc. In many cases the addition of alkaline earth metal oxide can be carried out concurrently with preparation of the initial silica gel. For example, a mixture of silica gel and alkaline earth silicate can be prepared directly from sodium silicate solutions by the addition of acidified solutions of salts of the alkaline earth metals.

The preferred Group VIII noble metals are platinum, rhodium, iridium, ruthenium, and palladium, in substantially the order named. Suitable amounts may range between about 0.05–4 percent by weight preferably about 0.2–2 percent. A single metal, or any desired combination of two or more may be employed. The desired noble metal or metals may be added to the silica gel base by conventional methods such as impregnation with aqueous solutions of salts thereof, such impregnation being carried out either before or after the addition of alkaline earth metal. According to a preferred procedure, the silica gel base is first soaked in dilute aqueous ammonia, and then contacted with a noble metal salt solution wherein the noble metal appears in the cation, whereby cationic noble metal is incorporated into the base by ion exchange with ammonium ions.

Following the final addition of active components, the wet gel is ordinarily drained, dried at relatively low temperatures, and calcined in air at temperatures up to about 400–600° C., preferably followed by reduction in hydrogen at similar elevated temperatures. Ordinarily, the catalyst is employed in the form of pellets or granules of a substantially uniform size ranging between about 1/16″ and 3/8″ diameter. The pelleting may be carried out at any desired stage of the manufacture, prior to the final calcining step. In some cases, the catalyst may be employed in a powder form.

Exemplary catalysts are as follows:

| 1% Pt | 1.5% Ir |
|---|---|
| 5% BaO | 7.5% SrO |
| 94% SiO$_2$ | 91% SiO$_2$ |
| 0.5% Rh | 1% Pd |
| 10% CaO | 5% BaO |
| 89.5% SiO$_2$ | 94% SiO$_2$ |

FEEDSTOCKS

From an operative standpoint, substantially any hydrocarbon feedstock may be employed herein which contains a substantial proportion of paraffin hydrocarbons containing at least six carbon atoms in a straight chain, and a total of 6 to about 12 carbon atoms. For practical purposes however it is preferred to utilize substantially pure normal paraffin feeds, e.g. n-hexane, n-heptane, n-octane, n-decane, etc. Benzene is produced in good yields from n-hexane; toluene from n-heptane, and xylenes from substantially any octane isomer containing at least six carbon atoms in a straight chain. In any case however it is preferred to employ feedstocks which contain a minimum of iso-paraffins.

PROCESS CONDITIONS

Process conditions are substantially conventional, and may be summarized as follows:

TABLE I

| | Broad range | Preferred range |
|---|---|---|
| Temperature, ° F. | 800–1,200 | 875–1,025 |
| Pressure, p.s.i.a. | 5–300 | 50–200 |
| H$_2$/feed mole-ratio | 1–50 | 5–30 |
| Contact time, seconds | 0.01–50 | 0.1–5 |
| LHSV (volume liquid feed/vol. catalyst/hr.) | 0.1–10 | 0.2–2 |
| Volume-percent conversion per pass | 10–80 | 20–60 |

The contacting is carried out in conventional fashion by passing the preheated mixture of feed and hydrogen through a bed of the catalyst. Interstage heating is ordinarily desirable, since the reaction is highly endothermic. It should be noted that hydrogen pressures in excess of about 300 p.s.i.g. are undesirable in that they tend thermodynamically to repress the dehydrocyclization reaction. In the preferred pressure ranges cited above the repression is negligible while at the same time a substantial beneficial effect is obtained of reducing catalyst deactivation rates by the hydrogenation of unsaturated coke precursors.

The following examples are cited to illustrate the invention and the results obtainable, but are not to be construed as limiting in scope:

EXAMPLE 1

Pure silica gel was prepared by hydrolysis of pure ethylorthosilicate with dilute aqueous ammonia at a pH of about 10. The hydrogel was dried at 220° F. to remove alcohol and much of the water filling its pores. The dried gel was then soaked in dilute aqueous ammonia (0.3 Normal) and a solution containing enough Pt(NH$_3$)$_4$Cl$_2$ to deposit 1% by weight of platinum on the silica (calcined basis) was added to the wet gel. The platinum salt was completely adsorbed from solution by ion exchange, giving a very high degree of dispersion of the metal after air calcination (500° C.) and reduction in hydrogen at 482° C.

EXAMPLE 2

A portion of the platinum-exchanged silica gel from Example 1 was soaked in a solution of barium nitrate before calcination. The amount of barium salt taken up was equivalent to 5% by weight of BaO based on the total calcined catalyst.

EXAMPLE 3

The catalysts of Examples 1 and 2 were tested for dehydrocyclization activity by passing a stream of hydrogen at atmospheric pressure and 50 cc./minute through a thermostatted packed column containing n-heptane at 20° C. and then through a one-gram bed of granulated catalyst (20–40 mesh) heated to reaction temperature. The contact time was about 0.5 second, or less. The effluent from the reactor was analyzed intermittently with a gas chromatograph. The results of the tests were as follows:

| Catalyst | Temperature, ° F. | Conversion, weight percent | Yield of toluene, weight percent | |
|---|---|---|---|---|
| | | | Per pass | Ultimate |
| Example: | | | | |
| 1 | 956 | 28 | 6.9 | 25 |
| 2 | 908 | 50 | 29.5 | 60 |

The low activity of the catalyst from Example 1 is evident from the high temperature required for 28% conversion. The poor selectivity of this catalyst is shown by the low yield of desired toluene, the balance being largely light hydrocarbon gases produced by hydrocracking. The presence of 5% BaO in the catalyst of Example 2 not only greatly improves selectivity of conversion to the desired product, but quite unexpectedly it greatly increases the activity of the platinum as shown by the higher conversion at a lower temperature.

EXAMPLE 4

When the procedure of Example 3 is repeated, using a stream of helium in place of the hydrogen, both catalysts are found to decline rapidly in activity. The barium-containing catalyst of Example 2, after two hours on stream, is found to give less than about 30% conversion at 908° F.

EXAMPLE 5

A catalyst consisting of 0.6% by weight of platinum supported on alumina, and containing 5% by weight of K$_2$O added by impregnation with potassium nitrate and calcining at 940° F., was tested for dehydrocyclization of n-heptane under the conditions described in Example 3. At 935° F., the per-pass yield of toluene was about 22%, as contrasted to the 29.5% yield obtained with the catalyst of Example 2 at the lower temperature of 908° F. It is thus evident that alkali-inhibited alumina is not the equivalent of the alkaline earth-inhibited silica gel catalyst of the present invention.

It is not intended that the invention should be limited to the details described above since many variations may be made by those skilled in the art without departing from the scope and spirit of the following claims.

I claim:
1. A method for the dehydrocyclization of paraffin hydrocarbons to produce aromatic hydrocarbons, which comprises contacting a paraffin feedstock containing a substantial proportion of paraffinic hydrocarbons having from about 6 to about 12 carbon atoms per molecule in admixture with at least about 1 mole of added hydrogen per mole of said feedstock, at elevated temperatures, and at pressures between about 0 and 300 p.s.i.g. with a catalyst consisting essentially of silica gel upon which is deposited about 0.05–4 percent by weight of at least one Group VIII noble metal, and a minor proportion of at least one alkaline earth metal oxide selected from the class consisting of calcium oxide, strontium oxide and barium oxide.

2. A method as defined in claim 1 wherein said paraffinic hydrocarbons have at least 6 carbon atoms in a straight chain.

3. The method of claim 1 wherein said alkaline earth metal oxide is selected from strontium oxide and barium oxide and comprises from about 1 to about 25 weight percent of said catalyst, and said hydrocarbons are contacted with said catalyst at a temperature within the range of about 800 to about 1200° F., a total pressure of about 5 to about 300 p.s.i.g. and an initial hydrogen to hydrocarbon mole ratio in the feed within the range of about 1 to about 50 for about 0.01 to about 50 seconds.

4. The method of claim 1 wherein said paraffinic hydrocarbons have at least about 6 carbon atoms in a straight chain, said alkaline earth metal oxide is selected from strontium oxide and barium oxide and comprises about 2 to about 15 weight percent of said catalyst, said silica has an average pore diameter within the range of about 50 to about 200 angstroms and a surface area within the range of about 100 to about 300 square meters per gram, and said hydrocarbons are contacted with said catalyst at a temperature within the range of about 875 to about 1025° F., under a total pressure of about 50 to about 200 p.s.i.g. and an initial hydrogen to hydrocarbon mole ratio in the feed within the range of about 5 to about 30 for a period of about 0.01 to about 50 seconds.

5. The method of claim 1 wherein said hydrocarbons have at least about 6 carbon atoms in a straight chain, said alkaline earth metal oxide is barium oxide and comprises about 2 to about 15 weight percent of said catalyst, said Group VIII metal is platinum, and said hydrocarbon is contacted with said catalyst at a temperature within the range of about 800 to about 1200° F., a total pressure within the range of about 5 to about 300 p.s.i.g. and an initial hydrogen to hydrocarbon mole ratio in the feed within the range of about 1 to about 50 for a period of about 0.01 to about 50 seconds.

6. A method as defined in claim 1 wherein said silica gel has an average pore diameter in the range of about 50–200 A., and a surface area in the range of about 100–300 sq. meters per gram.

7. The method of contacting a hydrocarbon feed having a substantial proportion of paraffinic hydrocarbons having from about 6 to about 12 carbon atoms per molecule and hydrogen at an initial hydrogen to hydrocarbon mole ratio in the feed within the range of about 1 to about 50 with a catalyst consisting essentially of silica gel having deposited thereon from about 2 to about 15 weight percent of an alkaline earth metal oxide selected from strontium oxide and barium oxide, and about 0.05 to about 4 weight percent of at least one Group VIII metal at a temperature within the range of about 800 to about 1200° F. and a total pressure of about 5 to about 300 p.s.i.g. for a period of about 0.01 to about 50 seconds.

References Cited

UNITED STATES PATENTS

| | | | |
|---|---|---|---|
| 2,929,775 | 3/1960 | Aristoff et al. | 208—133 |
| 2,972,644 | 2/1961 | Holmes et al. | 260—673.5 |
| 2,987,560 | 6/1961 | Holmes et al. | 260—673.5 |
| 3,374,281 | 3/1968 | Csicsery | 260—673 |
| 2,972,644 | 2/1961 | Holmes et al. | 260—673.5 |
| 2,987,560 | 6/1961 | Holmes et al. | 260—673.5 |

OTHER REFERENCES

Oblad et al., "Advances in Catalysis," vol. 3, page 206 (1951).

DELBERT E. GANTZ, Primary Examiner

G. E. SCHMITKONS, Assistant Examiner

U.S. Cl. X.R.

252—457